United States Patent
Balasubramanian et al.

(10) Patent No.: US 7,379,480 B2
(45) Date of Patent: May 27, 2008

(54) FAST FREQUENCY ADJUSTMENT METHOD FOR SYNCHRONIZING NETWORK CLOCKS

(75) Inventors: Sivaram Balasubramanian, Solon, OH (US); Kendal R. Harris, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 935 days.

(21) Appl. No.: 10/347,658

(22) Filed: Jan. 16, 2003

(65) Prior Publication Data

US 2004/0141526 A1 Jul. 22, 2004

(51) Int. Cl.
*H04J 3/07* (2006.01)
*H04J 3/06* (2006.01)

(52) U.S. Cl. .................. 370/516; 370/503; 370/509

(58) Field of Classification Search ............... 370/516
See application file for complete search history.

(56) References Cited

U.S. PATENT DOCUMENTS

| | | | |
|---|---|---|---|
| 4,893,271 A * | 1/1990 | Davis et al. ............. | 713/501 |
| 5,027,297 A * | 6/1991 | Garitty et al. ............. | 702/187 |
| 5,566,180 A | 10/1996 | Eidson et al. | |
| 5,936,940 A * | 8/1999 | Marin et al. ............. | 370/232 |
| 6,236,277 B1 | 5/2001 | Esker | |
| 6,246,702 B1 * | 6/2001 | Fellman et al. ............. | 370/503 |
| 6,252,445 B1 | 6/2001 | Eidson | |
| 6,278,710 B1 * | 8/2001 | Eidson ..................... | 370/394 |
| 6,347,084 B1 * | 2/2002 | Hulyalkar et al. ........ | 370/347 |
| 6,370,159 B1 | 4/2002 | Eidson | |
| 6,373,834 B1 * | 4/2002 | Lundh et al. .............. | 370/350 |
| 6,438,702 B1 * | 8/2002 | Hodge ....................... | 713/400 |
| 6,449,291 B1 * | 9/2002 | Burns et al. ............... | 370/516 |
| 6,665,316 B1 * | 12/2003 | Eidson ..................... | 370/509 |
| 6,766,309 B1 * | 7/2004 | Cheng et al. .............. | 706/3 |
| 6,981,361 B2 * | 1/2006 | Koshoffer et al. ......... | 60/204 |
| 7,047,023 B1 * | 5/2006 | Tso ........................ | 455/456.6 |
| 2002/0163932 A1 * | 11/2002 | Fischer et al. ............. | 370/465 |
| 2004/0114607 A1 * | 6/2004 | Shay et al. ............. | 370/395.42 |
| 2005/0013394 A1 * | 1/2005 | Rausch et al. ............. | 375/356 |
| 2005/0078711 A1 * | 4/2005 | Stallkamp .................. | 370/503 |

OTHER PUBLICATIONS

Klaus Schossmaier et al., Specification and Implementation of the Universal Time Coordinated Synchronization Unit (UTCSU), Special Issue on the Challenge of Global Time in Large-Scale Distributed Real Time Systems, 1-35, Kluwer Academic Publishers, Boston, manufactued in The Netherlands.

Schossmaier, et al., "Specification and Implementation of the Universal Time Coordinated Synchronization Unit (UTCSU)", Challenge of Gobal Time in Large-Scale Distributed Real-Time Systems, 1-35, Kluwer Academic Publishers, The Netherlands.

* cited by examiner

*Primary Examiner*—Kwang Bin Yao
*Assistant Examiner*—Ju-Tai Kao
(74) *Attorney, Agent, or Firm*—Boyle Frederickson LLP; R. Scott Speroff

(57) ABSTRACT

A method of precisely synchronizing clocks held in separate nodes on a communication network is provided that adjusts clock frequency based on a measure of relative clock rates and absolute clock offsets. In one embodiment, clock convergence is obtained with one synchronization session.

25 Claims, 3 Drawing Sheets

FAST FREQUENCY ADJUSTMENT METHOD FOR SYNCHRONIZING NETWORK CLOCKS

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to industrial controllers for the control of machines and processes and in particular, for an industrial controller whose components communicate over a network and have precisely synchronized local clocks.

Industrial controllers are special purpose computers and circuitry for the control of processes and machinery, for example, in a factory or the like. The industrial controller reads inputs from sensors associated with the controlled process and, executing one or more stored programs, provides outputs to actuators associated with the controlled process according to the stored control programs and inputs received by the control programs.

The process may encompass a large area and thus it is known to distribute the components of the industrial controller so that each component may be close to the particular portion of the process to which it is related. These separated components communicate with each other on a high-speed network.

For many applications, the speed of communication on the high-speed network is not sufficiently fast to properly synchronize operations at the various components of the industrial controller. For this reason, it is desirable to have precisely coordinated local clocks that can be used to synchronize events or data gathering at the spatially separated components of the industrial controller.

Such local clocks will tend to drift apart over time either due to minute differences in the natural frequencies of the crystal oscillators in the clocks which causes a steady drift in relative time between the clocks, or because of differences in operating conditions such as temperature, mechanical shock, and aging which causes a variable drift in relative time between the clocks.

For these reasons, a correction process is needed to maintain individual clocks in synchrony. The IEEE 1588 "Standard for a Precision Clock Synchronization Protocol for Networked Measurement and Control Systems" is directed to maintaining the synchrony between clocks on a network. The IEEE standard defines messages that can be used to exchange timing information, although it does not define a method of implementing time synchronization using these messages.

Particularly for nondeterministic networks, such as Ethernet, efforts to synchronize clocks using network communications are hampered by the unknown delays that will be introduced by the networks. Tight synchronization, necessary to avoid large corrective jumps in the relative time of local clocks, may require frequent synchronization signals that may adversely affect the available network bandwidth.

BRIEF SUMMARY OF THE INVENTION

The present invention provides a method of precisely synchronizing clocks on a network using a simple calculation that corrects relative errors in time and frequency in as little as one cycle of the synchronization process. The correction operates on clock frequency and thus eliminates jumps in time values.

Specifically, the present invention provides a method of synchronizing clocks in separate nodes on a communication network starting with the step of determining a count rate of a master clock in a master node and a count rate of a slave clock in a slave node. The difference between the time values of the master clock and slave clock are then determined at a given point in time. The rate of the slave clock is adjusted based on the count rates of the master and slave clocks and on the difference in their clock values to cause the count rates and the counts of the master clock and slave clock to converge.

Thus, it is one object of the invention to use a measurement of relative count rates, not just a measurement of time value difference, to provide improved control over the convergence of two clocks.

These steps may be performed at regular intervals and the adjustment of the slave clock rate may be such as to promote convergence of the master and slave clock by the first interval after the adjustment.

Thus, it is another object of the invention to provide a rapid convergence of the clocks on a network. This rapid convergence provides a predictable locking of the frequencies and times of the clock regardless of their initial conditions and provides close tracking between the clocks limited only by the length of the intervals.

When the count rate of the master clock is MCC and the count rate of the slave clock is SCC and the difference between the count of the master clock and the count of the slave clock is CCD, the adjustment of the speed of the slave clock may multiply the speed of the slave clock by $$\frac{MCC + CCD}{SCC}.$$

Thus, it is another object of the invention to provide a simple calculation for synchronizing clocks that may be implemented in firmware or software at high speed.

Determining the count rates of the two clocks may measure, at a first and second corresponding time n−1 and n, clock values $MCT_{n-1}$ and $MCT_n$ at the master clock and clock values $SCT_{n-1}$ and $SCT_n$ at the slave clock. The values of $MCT_{n-1}$ and $MCT_n$ may be subtracted to get the count rate of the master clock and the values of $SCT_{n-1}$ and $SCT_n$ may be subtracted to get the count rate of the slave clock.

The values $MCT_{n-1}$ and $SCT_{n-1}$ and $MCT_n$ and $SCT_n$ may be provided to the slave node where adjustment of the slave clock is performed by transmitting, at a first and second time n−1 and n, from the master node to the slave node, a first and second synchronization message. The time of the transmission of the first and second synchronization messages is recorded at the master node as $MCT_{n-1}$ and $MCT_n$ and the time of the receipt of the first and second synchronization messages at the slave node is recorded as $SCT_{n-1}$ and $SCT_n$. $MCT_{n-1}$ and $MCT_n$ is then transmitted from the master node to the slave node.

Thus, it is another object of the invention to communicate necessary information about the clock rate of the master node to the slave node in a way that is relatively indifferent to constant network delay.

The count difference between the slave clock and master clock may be determined by transmitting from the master node to the slave node a synchronization message. The time of the transmission synchronization messages is recorded at the master node as $MMT_n$ and the time of the receipt of the synchronization messages is recorded at the slave node as $SCT_n$. $MMT_n$ is then transmitted from the master node to the slave node and an estimate network delay is added to $MMT_n$ to determine a master clock time $MCT_n$. The difference between $MCT_n$ and SCT is then determined.

Thus, it is another object of the invention to provide a method of deducing at the slave node the difference between the master clock value and the slave clock value using the connecting network and standard IEEE synchronization messages.

The network delay may be estimated by taking the average difference between transmission times and arrival times of delay assessing messages passing from the master node to the slave node and from the slave node to the master node, respectively.

Thus, it is another object of the invention to provide a method that corrects for unknown or slowly varying network delay such as may be found on nondeterministic type communication networks such as Ethernet.

These particular objects and advantages may apply to only some embodiments falling within the claims and thus do not define the scope of the invention.

DETAILED DESCRIPTION OF THE PREFERRED EMBODIMENT

Figure 1:
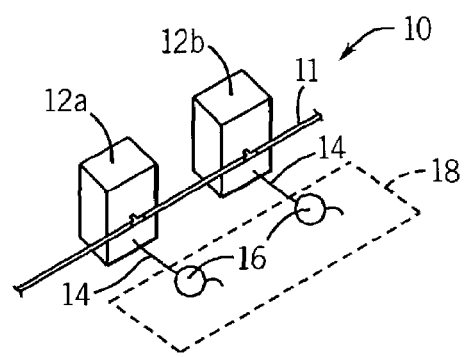
FIG. 1 is a perspective view of a simple industrial control system having a master and slave node communicating on a network and individually communicating with components of a controlled process.

Referring now to FIG. 1, an industrial controller 10 may include a communication network 11, such as Ethernet, connecting a first node 12a and a second node 12b, both being components of an industrial controller. Each node 12 may also provide at least one input or output line 14 communicating with a sensor or actuator 16 in turn connected to the industrial process 18 as is understood in the art.

Each of the nodes 12 may include a clock (as will be described below) providing for a local time. One clock is designated a master clock and other slave clocks are synchronized to the master clock over the network 11.

Figure 2:
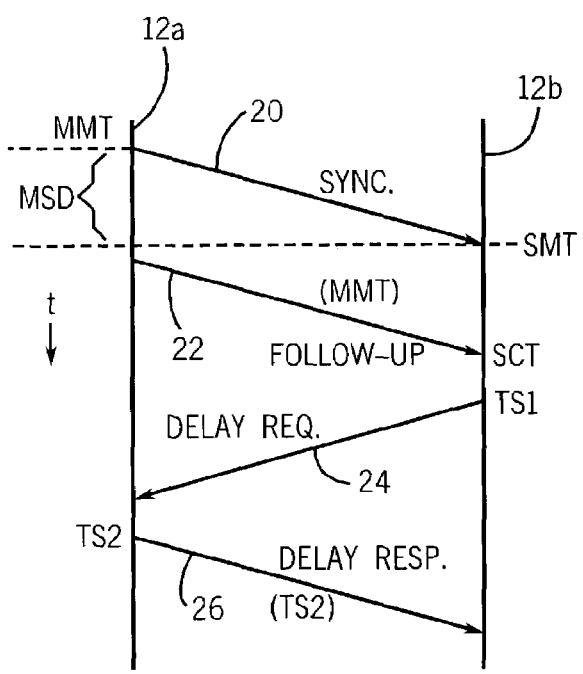
FIG. 2 is a graph showing a transmission sequence of IEEE synchronization messages that may be used in the present invention.

Referring now to FIG. 2, each of the nodes 12 may send and receive time synchronization messages defined by IEEE standard 1588 hereby incorporated by reference. Following this protocol, a master node 12a may send a synchronization message 20 to the slave node 12b followed by a follow-up message 22 sending a value of the local time at the master node 12 at which the synchronization message 20 was sent. Similarly, slave node 12b may send a delay request message 24 to the master node 12a, which may reply, with the delay response message 26 sending a value of the local time at the master node 12 at which the delay request message 24 was received. As will be described below, the present invention uses these messages for clock synchronization.

Figure 3:
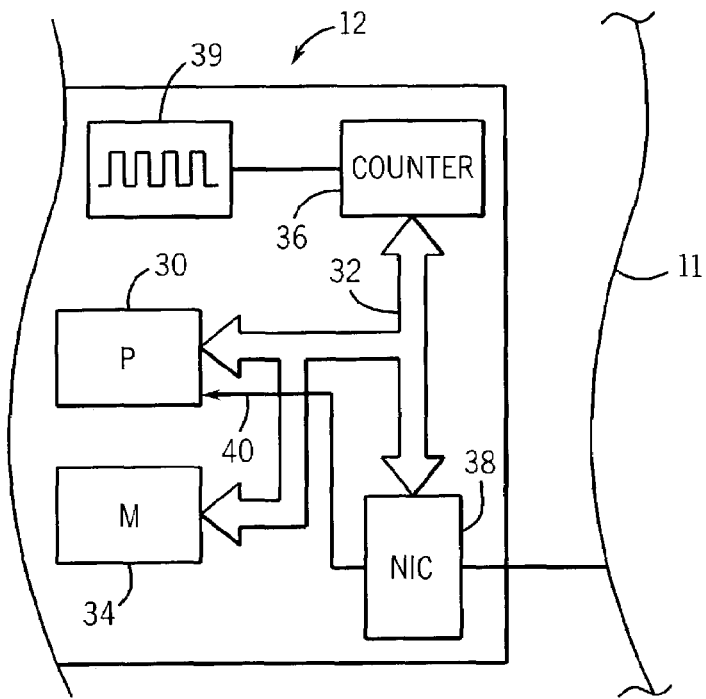
FIG. 3 is a simplified schematic of the circuitry of a node of FIG. 1 such as may implement the present invention in software using standard industrial controller components.

Referring to FIG. 3, each of the nodes 12 may include an internal processor 30 communicating by an internal bus 32 with a memory 34 holding a stored program executed by the processor 30. The processor 30 also communicates via bus 32 with a network interface circuit 38 which in turn communicates with the network 11. The network interface circuit provides the ability to send an interrupt signal via interrupt line 40 to the processor indicating when a message has been received or transmitted.

In the first embodiment of the present invention, a local clock may be implemented by a general-purpose counter 36 receiving a clock signal from an oscillator 39 and also communicating with the bus 32. The output of the counter 36 may be read by the processor 30 over the bus 32, but it is not assumed that the speed of the counter 36 or oscillator may be directly controlled.

All of these components are typically found on standard industrial controller nodes 12 and may be used to allow the processor 30 to time stamp messages being transmitted or received by network interface circuitry 38 on the network 11. Generally, at the time of the interrupt over interrupt line 40, the processor 30 reads the value of the counter 36 and stores that value in memory 34. The counter 36, though fixed in frequency and offset may have its value manipulated by a program (dividing or multiplying the counter value and/or adding or subtracting a value to the counter value) to create a virtual frequency and offset controlled virtual local clock that may be synchronized with other clocks as will be described below.

Figure 4:
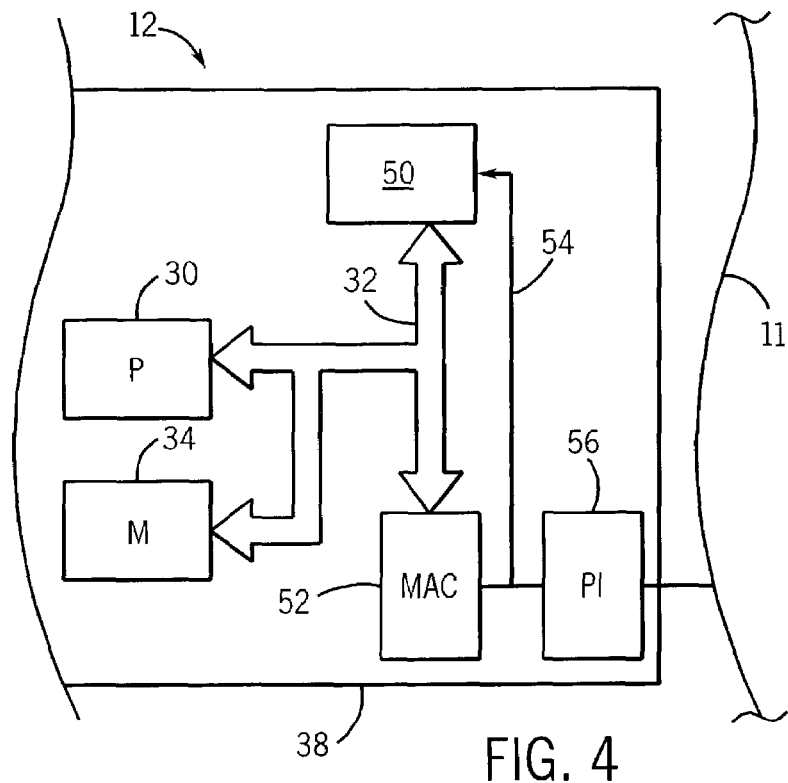
FIG. 4 is a view similar to that of FIG. 3 showing implementation of the present invention in dedicated circuitry communicating with a standard network interface.

Referring now to FIG. 4, in an alternative embodiment, the functions of the counter 36 and oscillator 39 may be performed by a time stamp circuit 50 also communicating on the internal bus 32 with processor 30 and memory 34. The time stamp circuit 50 eavesdrops, via line 54, on signals passing between the media access circuit 52 physical interface 56 forming parts of the network interface circuit 38.

Figure 5:
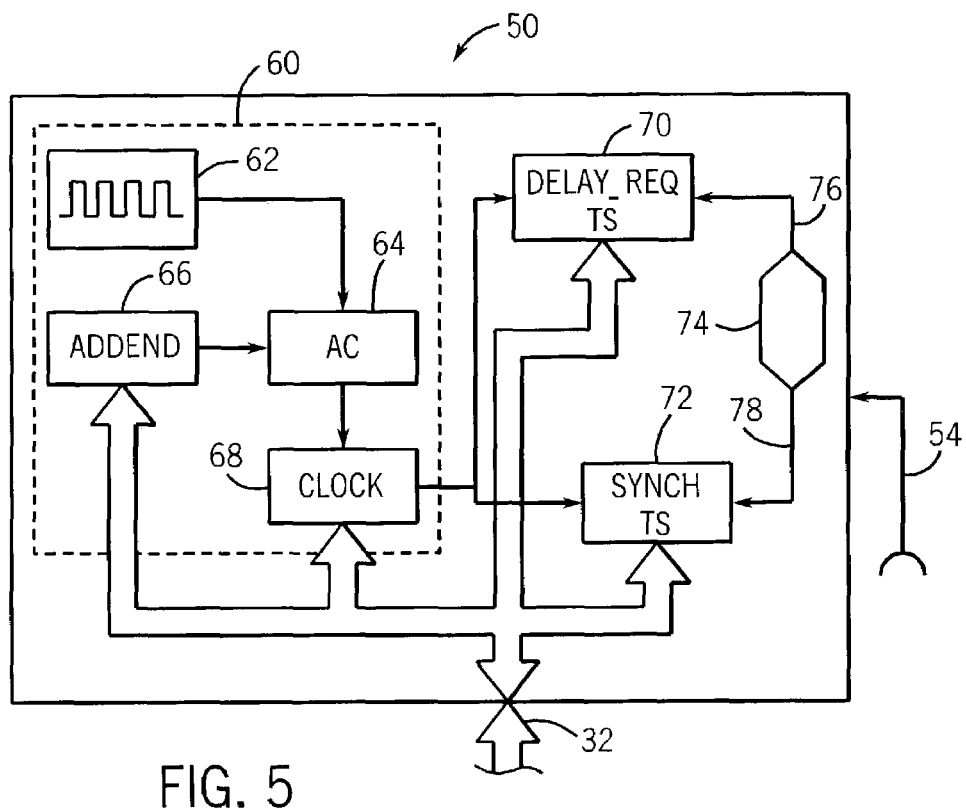
FIG. 5 is a detailed view of the circuitry of FIG. 4 showing components of a variable speed clock and time stamping hardware.

The time stamp circuit 50 provides time stamping of time synchronization messages wholly apart from programs executed by the processor 30 and a true variable speed clock. Referring now to FIG. 5, the time stamp circuit 50 implements a variable speed clock 60 receiving an input from a fixed frequency oscillator 62, which may be internal to the time stamp circuit 50 (as shown) or from an external source including the clock used generally by the node 12 (not shown).

The oscillator 62 provides a clock signal to an accumulator 64 causing the accumulator 64 to add a value received from an addend register 66 to the current contents of the accumulator 64. Repeated addition operations triggered by the oscillator 62 cause a regular overflow of the accumulator at an overflow output of the accumulator 64. The signal from the overflow output strobes a count input of a clock counter 68 which provides a local clock for the node 12. The value in the addend register 66 may be loaded by the processor 30 via bus 32 so that processor 30 may effectively control the frequency of the clock counter 68.

Initially, the addend register 66 will be loaded by the processor 30 with a value equal to $2^w$ divided by FDC, where w is the width of accumulator 64 and FDC is a constant representing the ratio of frequency of oscillator 62 to desired nominal frequency of local clock counter 68.

For the purpose of time stamping, the output value of the clock counter 68 is relayed to both a "delay request message" time stamp register 70 and in parallel to a "synchronization message" time stamp register 72. These registers also communicate with bus 32 allowing processor 30 to read the values of time stamps.

The time stamping occurs under the control of time message detector circuit 74 detecting the "delay request message" and "synchronization message" via line 54 described above and routing a time stamp signal to the appropriate register through strobing on lines 76 and 78 according to methods understood in the art.

The present invention provides synchronization in frequency and value of local clocks formed either from counter 36 or from clock counter 68 on a master and slave node 12a and 12b.

Figure 6:
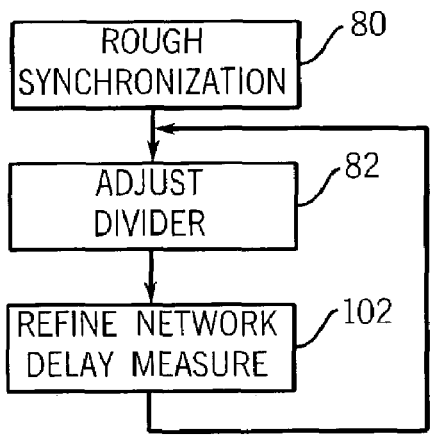
FIG. 6 is a flowchart showing the steps of synchronization implemented by the present invention.

Referring now to FIG. 6, at a first process block 80 in a program executed by processors 30 of master node 12a and slave node 12b, a rough synchronization of the clocks of the master node 12a and slave node 12b is performed. This rough synchronization may be performed whenever there is a disruption of the network 11 or a new node is connected.

Referring also to FIG. 2, this rough synchronization performs the following steps: First, a synchronization message 20 is sent from the master node 12a to the slave node 12b with the time of transmission, MMT, (determined by the local clock of the master node 12a) being stored by the master node 12a and the time of reception SMT (determined by the local clock of the slave node 12b) being stored by the slave node 12b. This storage may be accomplished either by operation of the processor reading the counter 36 upon strobing of the processor 30 by the network interface circuit 38 or by detection of the synchronization signal by time stamp circuit 50 shown in FIG. 4.

Second, at a later time, the stored value MMT at the master node 12a is transmitted in a follow-up message 22 to the slave node 12b. Third, upon receipt of the follow-up message 22, the slave node 12b reads its local clock to obtain a slave clock time SCT.

Third, the SMT value is subtracted from the SCT value and the MMT value is added to the difference (together with a constant time estimating the time necessary to perform these calculations by the processor 30 of the slave node 12b), and this value is written to the local clock (36 or 68) as a new time value.

As will be understood, the above calculation effectively assumes that the delay on the network MSD in FIG. 2 is zero, and while this is not necessarily correct for most networks, it provides a first rough alignment of the clocks.

Referring again to FIG. 6 at a succeeding processor block 82, once the rough adjustment is complete, a fine adjustment process is implemented to keep the local clocks of nodes 12a and 12b in alignment without the jump that occurred in clock values that occurred with respect to process block 80.

Figure 7:
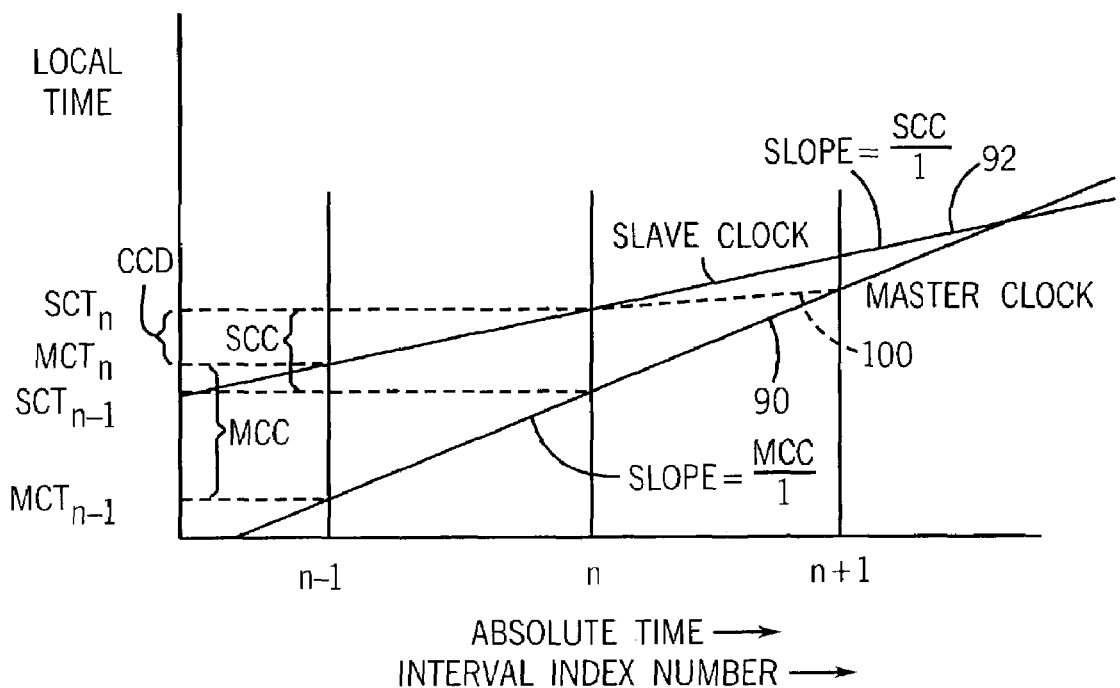
FIG. 7 is a graph plotting clock values of a slave and master clock showing values measured and used in the calculations performed in the present invention.

Referring now to FIG. 7, generally each of the local slave and master clocks will have different time values and different rates as indicated by sloped lines 90 for the master clock and 92 for the slave clock. The graph of FIG. 7 provides a horizontal axis of absolute time superimposed on a horizontal axis of correction interval. The correction interval for each of the local clocks will generally not align in absolute time but are shown aligned for clarity. The vertical axis of FIG. 7 is local time of the master and slave clocks.

At a first interval n−1, a measurement is made of the master clock time, $MCT_{n-1}$, and the slave clock time $SCT_{n-1}$. These values may be triggered by the transmission of a synchronization message 20 as shown in FIG. 2 where $MCT_{n-1}$ is MMT and $SCT_{n-1}$ is SMT as shown in FIG. 2. At a somewhat later time, this process may be repeated to collect values $MCT_n$ and $SCT_n$. Desirably, an equal time will have elapsed between the acquisition of MCT values on the master clock 12a and SCT values on the slave clock 12b.

A master clock count rate MCC may be deduced by subtracting $MCT_{n-1}$ from $MCT_n$ and likewise a slave clock count rate SCC may be determined by subtracting $SCT_{n-1}$ from $SCT_n$. This subtraction process may be performed either at the master node 12a or slave node 12b after the MCT values are transferred via follow-up messages 22. The accuracy of these values is limited only by the consistency of the master to slave delay, MSD, value caused by transmission delays on the network 11.

At interval n, a clock count difference CCD is calculated being, for example, the value of $SCT_n$ subtracted from the value of $MCT_n$ and the MSD value added as may be best estimated. Initially, MSD is estimated to be zero but as will be understood from the following description eventually this is refined.

A correction ratio is then formed having a numerator being the sum of $MCC_n$ and CCD and a denominator of $SCC_n$. That is:

$$\frac{MCC + CCD}{SCC}.$$

This correction ratio may be applied to the clock of the local slave node 12b by adjusting the addend register 66 of FIG. 5 and FIG. 4 to properly adjust the frequency of the overflow of the accumulator 64 according to this ratio.

Alternatively in the embodiment of FIG. 3, the above correction ratio is applied by the processor 30 to the value contained in a virtual addend register. Initially, the virtual addend register will be loaded by the processor 30 with a value equal to $2^w$ divided by FDC, where w is the width of a virtual accumulator and FDC is a constant representing the ratio of frequency of oscillator 39 to desired nominal frequency of virtual local clock counter. Let HC represent the change in count value of the counter 36 since the interval of the last correction. Then a scaled change in count value is computed by multiplying HC with value of virtual addend register and dividing the result by $2^w$, where w is the width of virtual accumulator. This scaled change in count value is added to the last corrected count value of virtual clock counter to produce a current corrected count value which may be used for current timing needs such as time stamping and as the basis for the next correction.

It will be understood that the clock rate of the slave (the slope of line 92) is SCC and thus when this clock rate is multiplied by the correction ratio will cause the new clock rate to equal MCC+CCD. Thus after one additional interval, the local times of the master and slave clocks will converge as indicated by dotted line 100 at which time a new correction process will occur causing the slave and master clock both to have slopes of MCC. Thus, all error is eliminated after a signal correction interval provided the underlying drift between the clocks is constant and the network delay is properly estimated.

It will be understood from this description, therefore, that the accuracy of this correction depends in part on the ability to accurately estimate the master to slave delay MSD. This estimate, which is initially zero, is refined as indicated in FIG. 6 at process block 102 and in FIG. 2, by repeated delay request, delay response messages. In this cycle, a message is initiated by the slave node 12b which obtains a time stamp of the time of transmission TS1 using its local clock. The receipt of this delay request message 24 is time stamped by the master node 12a as value TS2. This TS2 value is returned via the delay response message 26. The current estimate of MSD is subtracted from the difference between time stamps TS2 minus TS1 and the resulting value is divided by 2 to produce next estimate of master to slave delay MSD.

This process may be repeated over many cycles and the average obtained over a number of such cycles to improve the accuracy of this estimate. Further, if the values obtained that deviate by more than a predetermined amount, they may be discarded so as to provide the best possible estimate of MSD values.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of synchronizing clocks in separate nodes on a communication network, the clocks providing count outputs to the nodes, the method comprising the steps of:
   a) determining a count rate of a master clock in a master node and a count rate of a slave clock in a slave node;
   b) determining the difference between the clocks of the master clock and the slave clock at a corresponding time;
   c) determining a network delay between the master node and the slave node by sending first time stamped messages from a first node of the master node and slave node to a second node of the master node and slave node and sending a second time stamped message from the second node to the first node also including a first delay between the time stamp of the first time stamped message and its receipt time, the network delay being an average of the first delay and a second delay between the time stamp of the second time stamped message and its receipt time;
   d) adjusting a speed of the slave clock based on the count rates and the difference and the network delay to cause the count rates and the counts of the master clock and slave clock to converge without large corrective jumps so that no count output of the slave clock is skipped.

2. The method recited in claim 1 wherein steps (a) to (c) are performed at regular intervals and wherein the adjustment of step (c) causes the count rates of the master clock and slave clock to converge by the first interval after the corresponding time.

3. The method recited in claim 1 wherein steps (a) to (c) are performed at regular intervals and wherein the adjustment of step (c) is such as to cause the count difference of the master clock and slave clock to converge to zero by the first interval after the corresponding time.

4. The method recited in claim 1 wherein the count rate of the master clock is MCC and the count rate of the slave clock is SCC and the difference between the count of the master clock and the count of the slave clock is CCD and wherein the adjustment of the speed of the slave clock multiplies the speed of the slave clock by $$\frac{MCC + CCD}{SCC}.$$

5. The method as recited in claim 1 wherein step (a) includes the steps of
   i) determining at a first and second corresponding time n−1 and n, clock values $MCT_{n-1}$ and $MCT_n$ at the master clock and clock values $SCT_{n-1}$ and $SCT_n$ at the slave clock;
   ii) subtracting the values of $MCT_{n-1}$ and $MCT_n$ to get the count rate of the master clock; and
   iii) subtracting the values of $SCT_{n-1}$ and $SCT_n$ to get the count rate of the slave clock.

6. The method of claim 5 wherein the corresponding values $MCT_{n-1}$ and $SCT_{n-1}$ and $MCT_n$ and $SCT_n$ of step (i) are determined at the slave node by the steps of:
   I) at a first and second time n−1 and n transmitting from the master node to the slave node a first and second synchronization message;
   II) recording the time of the transmission of the first and second synchronization messages at the master node as $MCT_{n-1}$ and $MCT_n$;
   III) recording the time of the receipt of the first and second synchronization messages at the slave node as $SCT_{n-1}$ and $SCT_n$; and
   IV) transmitting $MCT_{n-1}$ and $MCT_n$ from the master node to the slave node.

7. The method of claim 1 wherein the count difference is determined at the slave node by the steps of:
   I) transmitting from the master node to the slave node a synchronization message;
   II) recording the time of the transmission synchronization messages at the master node as $MMT_n$;
   III) recording the time of the receipt of the synchronization messages at the slave node as $SCT_n$;
   IV) transmitting $MMT_n$ from the master node to the slave node;
   V) adding estimated network delay MSD to $MMT_n$ to determine a master clock time $MCT_n$; and
   VI) determining the difference between $MCT_n$ and $SCT_n$.

8. The method of claim 7 wherein the network delay is estimated by taking the average difference between transmission times and arrival times of delay assessing messages passing from the master node to the slave node and from the slave node to the master node, respectively.

9. The method of claim 8 wherein the network delay is averaged over a plurality of delay assessing messages.

10. The method of claim 7 wherein the network delay is initially assumed to be zero.

11. A clock synchronization system including:
   a network;
   a master node having a master clock providing a count output and communicating on the network;
   at least one slave node having a slave clock providing a count output and communicating on the network;
   wherein the master node and slave node execute stored programs to perform the steps of:
   a) determining a count rate of the master clock and a count rate of a slave clock over a predetermined period of time;
   b) determining the difference between the time values of the master clock and the slave clock at a corresponding time;

c) determining a network delay between the master node and the slave node by sending first time stamped messages from a first node of the master node and slave node to a second node of the master node and slave node and sending a second time stamped message from the second node to the first node also including a first delay between the time stamp of the first time stamped message and its receipt time, the network delay being an average of the first delay and a second delay between the time stamp of the second time stamped message and its receipt time;

d) adjusting the speed of the slave clock based on the count rates and the difference and the network delay to cause the count rates and the counts of the master clock and slave clock to converge without large corrective jumps so that no count outputs of the slave clock is a skipped.

12. The clock synchronization system of claim 11 wherein the slave clock is a counter receiving an input from an oscillator passing through a variable divider and wherein adjusting the divisor of the variable divider changes the speed of the slave clock.

13. The clock synchronization system of claim 12 wherein the variable divider is an accumulator adding a value contained in an addend register according to the input from the oscillator and providing an output to the counter upon overflow of the accumulator.

14. The clock synchronization system of claim 11 wherein the slave clock is a counter receiving an input from an oscillator and wherein adjusting the speed of the slave clock is performed by arithmetic operation performed by a processor executing a stored program.

15. The clock synchronization system of claim 11 wherein the network is Ethernet.

16. The clock synchronization system recited in claim 11 wherein steps (a) to (c) are performed at regular intervals and wherein the adjustment of step (c) causes the count rates of the master clock and slave clock to converge by the first interval after the corresponding time.

17. The clock synchronization system recited in claim 11 wherein steps (a) to (c) are performed at regular intervals and wherein the adjustment of step (c) causes the count difference of the master clock and slave clock to converge to zero by the first interval after the corresponding time.

18. The clock synchronization system recited in claim 11 wherein the count rate of the master clock is MCC and the count rate of the slave clock is SCC and the difference between the count of the master clock and the count of the slave clock is CCD and wherein the adjustment of the speed of the slave clock multiplies the speed of the slave clock by $$\frac{MCC + CCD}{SCC}.$$

19. The clock synchronization system as recited in claim 11 wherein step (a) includes the steps of:

i) determining at a first and second corresponding time n−1 and n, clock values $MCT_{n-1}$ and $MCT_n$ at the master clock and clock values $SCT_{n-1}$ and $SCT_n$ at the slave clock;

ii) subtracting the values of $MCT_{n-1}$ and $MCT_n$ to get the count rate of the master clock; and iii) subtracting the values of $SCT_{n-1}$ and $SCT_n$ to get the count rate of the slave clock.

20. The clock synchronization system of claim 19 wherein the corresponding values $MCT_{n-1}$ and $SCT_{n-1}$ and $MCT_n$ and $SCT_n$ of step (i) are determined at the slave node by the steps of:

I) at a first and second time n−1 and n transmitting from the master node to the slave node a first and second synchronization message;

II) recording the time of the transmission of the first and second synchronization messages at the master node as $MCT_{n-1}$ and $MCT_n$;

III) recording the time of the receipt of the first and second synchronization messages at the slave node as $SCT_{n-1}$ and $SCT_n$;

IV) transmitting $MCT_{n-1}$ and $MCT_n$ from the master node to the slave node.

21. The clock synchronization system of claim 11 wherein the count difference is determined at the slave node by the steps of:

i) transmitting from the master node to the slave node a synchronization message;

ii) recording the time of the transmission synchronization messages at the master node as $MMT_n$;

iii) recording the time of the receipt of the synchronization messages at the slave node as $SCT_n$;

iv) transmitting $MMT_n$ from the master node to the slave node;

v) adding estimated network delay MSD to $MMT_n$ to determine a master clock time $MCT_n$; and vi) determining the difference between $MCT_n$ and $SCT_n$.

22. The clock synchronization system of claim 21 wherein the network delay is estimated by taking for each delay assessing message, an average difference between a transmission time and arrival time of the delay assessing message for delay assessing messages passing from the master node to the slave node and from the slave node to the master node, respectively.

23. The clock synchronization system of claim 22 wherein the network delay is averaged over a plurality of delay assessing messages.

24. The clock synchronization system of claim 21 wherein the network delay is initially assumed to be zero.

25. A method of synchronizing clocks in separate nodes on a communication network comprising the steps of:

a) determining a count rate of a master clock in a master node and a count rate of a slave clock in a slave node;

b) determining the difference between the clocks of the master clock and the slave clock at a corresponding time;

c) adjusting a speed of the slave clock based on the count rates and the difference to cause the count rates and the counts of the master clock and slave clock to converge;

wherein the count rate of the master clock is MCC and the count rate of the slave clock is SCC and the difference between the count of the master clock and the count of the slave clock is CCD and wherein the adjustment of the speed of the slave clock multiplies the speed of the slave clock by $$\frac{MCC + CCD}{SCC}.$$

* * * * *